(12) United States Patent
Gyllenhammer et al.

(10) Patent No.: US 9,813,342 B2
(45) Date of Patent: Nov. 7, 2017

(54) METHOD AND SYSTEM FOR IMPROVED LOAD BALANCING OF RECEIVED NETWORK TRAFFIC

(71) Applicant: Cavium, Inc., San Jose, CA (US)

(72) Inventors: Carl Richard Gyllenhammer, Northborough, MA (US); Wilson Parkhurst Snyder, II, Holliston, MA (US); Philip Romanov, Santa Clara, CA (US)

(73) Assignee: Cavium, Inc., San Jose, CA (US)

( * ) Notice: Subject to any disclaimer, the term of this patent is extended or adjusted under 35 U.S.C. 154(b) by 122 days.

(21) Appl. No.: 14/542,528

(22) Filed: Nov. 14, 2014

(65) Prior Publication Data

US 2016/0142320 A1    May 19, 2016

(51) Int. Cl.
*H04L 12/803* (2013.01)
*H04L 12/931* (2013.01)
*H04L 29/06* (2006.01)

(52) U.S. Cl.
CPC ............ *H04L 47/125* (2013.01); *H04L 49/70* (2013.01); *H04L 69/22* (2013.01)

(58) Field of Classification Search
CPC combination set(s) only.
See application file for complete search history.

(56) References Cited

U.S. PATENT DOCUMENTS

| | | | |
|---|---|---|---|
| 2008/0034101 A1* | 2/2008 | Tran ...................... | H04L 45/302 709/230 |
| 2014/0059111 A1* | 2/2014 | Veeraiyan ............... | H04L 67/02 709/201 |
| 2015/0124828 A1* | 5/2015 | Janraj ................. | H04L 12/4633 370/392 |

* cited by examiner

*Primary Examiner* — Yee Lam
(74) *Attorney, Agent, or Firm* — pkalousek.ip

(57) ABSTRACT

A method and a system embodying the method for load balancing of a received a packet based network traffic, comprising: receiving a packet at a software defined network switch; determining information pertaining to uniqueness of a packet flow for the received packet; providing the determined information and the received packet to a network interface controller; and processing the received packet at the network interface controller in accordance with the provided determined information, are disclosed.

14 Claims, 4 Drawing Sheets

METHOD AND SYSTEM FOR IMPROVED LOAD BALANCING OF RECEIVED NETWORK TRAFFIC

BACKGROUND

1. Field

The present disclosure relates to network communications. More particularly, this invention is directed toward a method and a system for improved load balancing of received network traffic.

2. Description of Related Technology

A communication network comprises a collection of terminal nodes and intermediate nodes, which are interconnected by a transmission medium to enable communication between the terminal nodes. A transmission medium comprises any medium enabling propagation of digital signals, e.g., optical cable, coaxial cable, wireless electromagnetic wave, and other media known to a person of ordinary skill in the art. In digital packet-switched communication networks, the data is transmitted over the network between the terminal nodes in a form of packets. A logical communication channel over a network is made up of multiple packets that are related. These related packets are all part of a unique flow and all packets for the unique flow must be processed in order. However, the transmission medium is not dedicated to a logical communication channel; consequently, a sequence of packets transmitted over the transmission medium may comprise a plurality of packet flows, with packets from different unique flows being interspersed with one another. Therefore, the different unique packet flows must be separated.

A solution known to a person of ordinary skill in the art comprises a Receive Side Scaling (RSS) also known as a Receive Flow Steering (RFS). The RSS attempts to discriminate among the different unique packet flows, assigns to each discriminated unique packet flow a unique Receive Queue (RQ), and provides the packets from each of the discriminated unique packet flow to one of the Receive Queues (RQ). Consequently, each of the different RQs, may comprise packets from one or more unique packet flows, which can then be assigned to one or more processing elements to allow for parallel processing. A queue is an organization of data into a structure in which entities, i.e., the data comprising a packet, are kept and are retrievable in a definite order.

The RSS achieves the above by extracting fields inside several known networking layers to build a key. A format of the key is controlled by a combination of memory lookups that are tied to the networking port on which a specific packet being processed was received, i.e., port lookup tables, together with information found in the various standardized networking header layers of the specific packet. The port and the information is then processed by an RSS mapping algorithm, i.e., RSS hash function, to select one RQ for the specific packet. The key and the RSS mapping algorithm are selected to insure that all packets in a unique flow are provided to the same RQ, but packets from different unique flows are (ideally) evenly spread among the different RQs.

However, as described supra, the RSS works on standard packet structures, i.e., packet structures with standardized networking layers, i.e., layers of the Open Systems Interconnection (OSI) model, and in particular on layers L2, L3, and L4, the RSS may not discriminate among unique flows, each flow comprising standard packet structures, and is ill equipped to deal with packets comprising new or evolving networking format structure based on the standardized networking layers.

By means of an example, consider two unique flows, each flow comprising standard packet structures, wherein the L4 and L3 layers are identical, and L2 layer differs in source and destination addresses. If the RSS extracts other fields than the source and destination addresses, the keys will be identical for the two unique flows; therefore, the RSS failed to discriminate between these two unique flows. Even when the RSS extracts, among the fields, the source and destination addresses, the keys may still be identical. Consider, by means of an example, that the key is generated by a simple addition of the fields. Thus when the source and destination addresses of the first unique flow is equal to the sum of the source and destination addresses of the second flow, the keys will be identical because the other fields have been stipulated to be the same. The probability of generating identical keys increases with increased traffic.

By means of an example of such a format structure, consider a Virtual Extensible Local area Network (VXLAN) tunneling protocol. As known to a person of ordinary skill in the art, tunneling is a technique by which communications performed using various network protocols are encapsulated using a tunnel protocol. The VXLAN tunneling protocol strips layer L2 from the original packet and encapsulates layers L3 and L4 of the original packet in a new structure with VXLAN's own L2, L3, and L4 layers. When presented to the RSS without stripping the tunnel encapsulated L2, L3, and L4 layers, the RSS works on the VXLAN's L2, L3, and L4 layers, but not on the L3 and L4 layers of the original packet. Consequently, should the encapsulated packets belong to one or more unique packet flows, the unique packet flows will not be separated and spread.

Furthermore, the RSS may fail on non-standard packet structures, i.e., packets not adhering to the OSI layering model. The non-standard packet structure may comprise a packet structure adding a non-standard field to a standard packet structure; a packet structure using a standard field in a non-standard manner.

An example of the former may comprise an information field added in front or in between layers L2, L3, and L4. When a packet with added field is presented to the RSS, the RSS rules are not designed to deal with the added field, and exception handling is called. Since the exception handling is a resource intensive process, it is desirable to minimize exception handling use.

An example of the latter non-standard packet structure may comprise correctly forming a Virtual Local Area Network (VLAN) layer L2, but inserting information not related to the VLAN to the layer L2. When such a packet presented to the RSS, the RSS rules will correctly recognize the VLAN layer L2, but since the information is unrelated to VLAN, the information will be interpreted incorrectly thus the packet will be incorrectly processed, or the RSS will be unable to interpret the information and exception handling is called, with the negative impact on resources as disclosed supra.

Accordingly, there is a need in the art for a method and a system implementing the method providing solution to load balancing of received traffic comprising packets with standard packet structure, packets with new and evolving networking extensions and format structures, and non-standard packet structures, by leveraging existing load balancing processes, as well as providing additional advantages.

SUMMARY

In an aspect of the disclosure, an apparatus and a method for load balancing of a received traffic according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
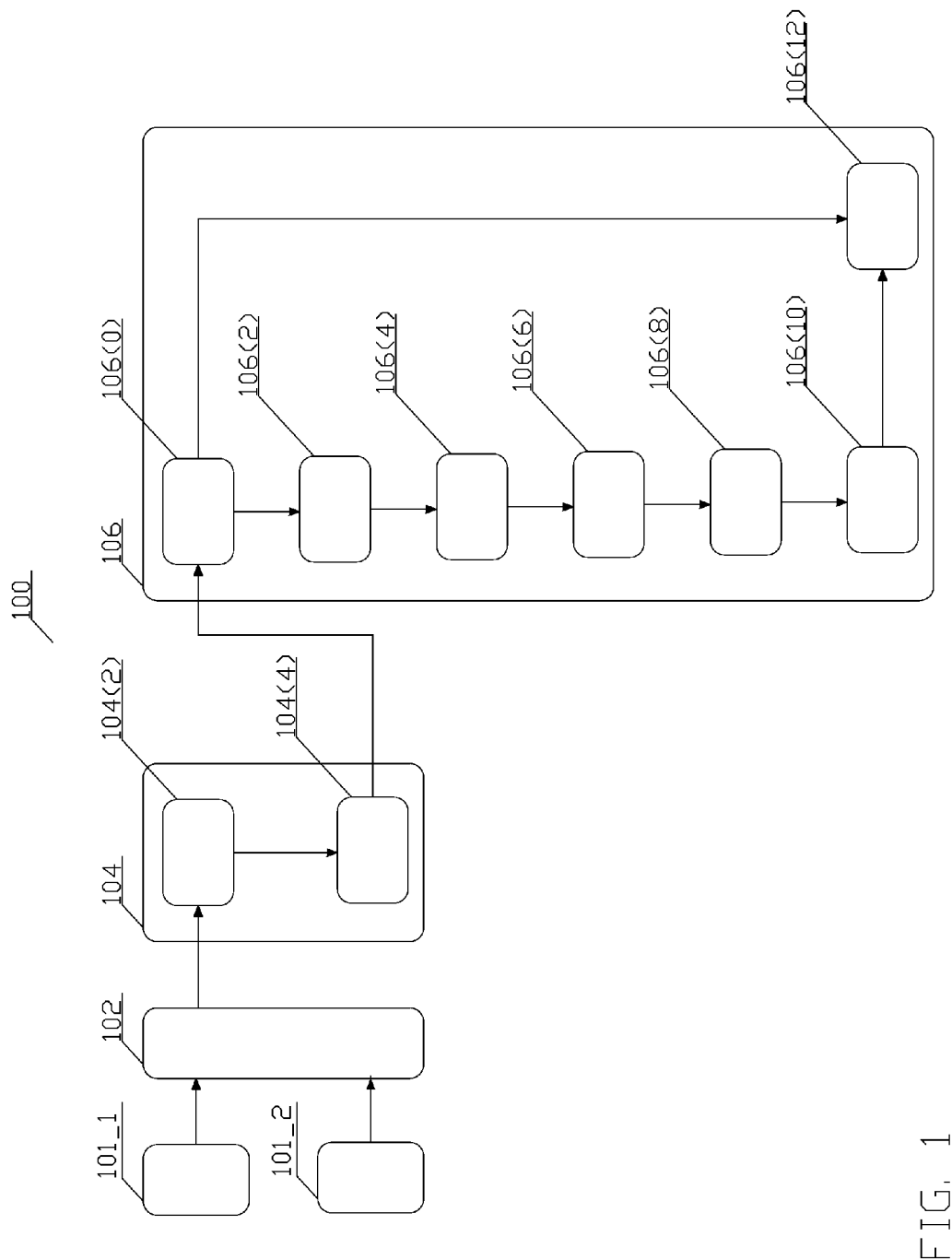
FIG. 1 depicts a conceptual structure of a system for load balancing of a received traffic in accordance with an aspect of this disclosure.
Figure 2:
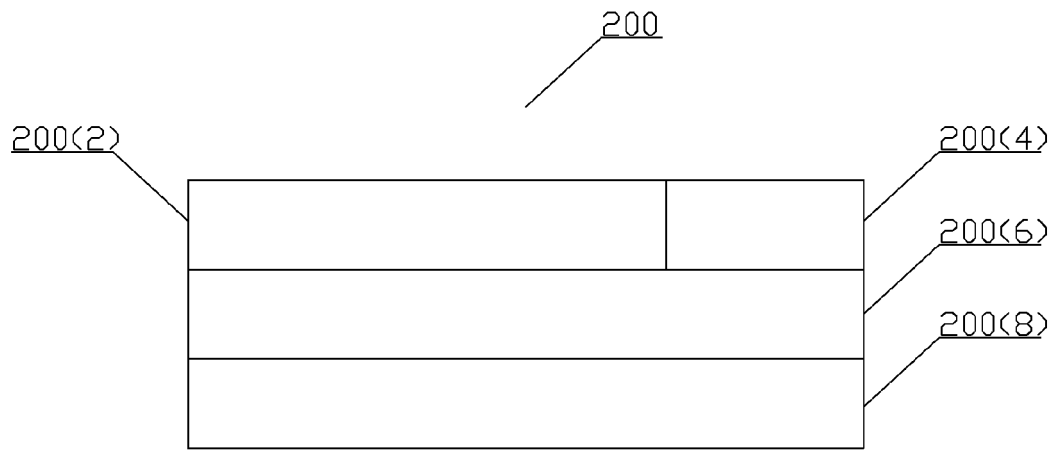
FIG. 2 depicts a conceptual structure of an SDN_HDR in accordance with an aspect of this disclosure.

The description of like structural elements among the figures, is not repeated, the like elements have reference numerals differing by an integer multiple of 100, i.e., reference numeral 102 in FIG. 1a, 1b, becomes reference numeral 202 in FIG. 2; unless differences and/or alternative aspects are explicitly noted. An expression "_X" in a reference indicates an instance of an element; an expression ("X") in a reference indicates a sub-block, in a drawing where helpful for better understanding. Any unreferenced double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1 depicts a conceptual structure of a system 100 for load balancing of a received traffic in accordance with an aspect of this disclosure. A packet of a sequence of packets (not shown) transmitted over the transmission medium (not shown) comprising a plurality of packet flows, with packets from different flows being interspersed with one another arrives at one of a physical ports 101_X of a network interface 102. By means of a non-limiting example, two physical ports are shown. The network interface 102 extracts the packet from the transmission medium and provides the packet together with the information indicating the physical port 101, i.e., a port number, to a Software Define Networks (SDN) switch 104.

As appreciated by a person of ordinary skill in the art, SDN is an architecture for networking, enabling management of network services through abstraction of lower level functionality. The architecture decouples network control, i.e., the system entities that makes decisions about where traffic is sent, and forwarding functions, i.e., the physical infrastructure entities that forward traffic to the selected traffic destination. Such a decoupling enables network control to become directly programmable and the underlying physical infrastructure to be abstracted from applications and network services.

The ability to program the network control, i.e., change the rules programmed into the SDN switch 104, enables changing the manner of processing packets arriving at the SDN switch 104. Consequently, the SDN switch 104 may be programmed with rules enabling recognition and processing of standard packet structures, new and evolving networking extensions and format structures based on the standardized networking layers, as well as processing of non-standard packet structures that may arrive at the SDN switch 104. The packet is provided to an SDN packet parser 104(2), which parses the packet according to the rules programmed into the SDN switch 104. Parsing comprises an analysis of information in the headers of the different layers comprising the packet, i.e., the layers comprising packets with standard packet structure, packets with new and evolving networking extensions and format structures, and non-standard packet structures. The parsed packet is then examined for fields and/or information contained in the fields according to the rules.

Thus, referring back to the example of the two unique flows, each flow comprising standard packet structures, wherein the L4 and L3 layers are identical, and L2 layer differs in source and destination addresses, the rules may be written, e.g., to discriminate the unique flows based on the source and/or destination addresses.

Similarly, referring back to the example of the VXLAN tunneling protocol supra, the rules may be written to instruct the SDN packet parser 104(2) to account for encapsulation layer structure L2, L3, and L4, and examine and identify additional layers of the OSI model past the encapsulation layers, i.e., the layers L3 and L4 of the encapsulated packet.

Similarly, referring to the examples of non-standard packet structures supra, the rules may be written to instruct the SDN packet parser 104(2) to account for the information field added in front or in between layers L2, L3, and L4. Likewise, when presented with a Virtual Local Area Network (VLAN) packet the rules may be written to instruct the packet parser 104(2) to examine whether layer L2 comprises information related to the VLAN or not, and to correctly interpret the information.

Based on the foregoing, a person of ordinary skill in the art will appreciate that the rules are specifically written for packets structures that may be expected at the SDN switch 104. In one aspect, the SDN switch 104 may be programmed with rules instructing the SDN packet parser 104(2) to parse packets arriving at all the physical interface(s) 101, and instructing the SDN_HDR generator 104(4) to generate a header.

A person of ordinary skill in the art will appreciate that not all the layers need to be parsed and examined; consequently, the parsing does need to be an expensive operation in terms of processing. However, the parsing operation may become expensive with increasing number and/or complexity of the rules and increased network traffic.

Therefore, in another aspect, the SDN switch 104 may be programmed with rules instructing the SDN packet parser 104(2) to parse packets arriving at specified physical interface(s) 101 because these packets may comprise new and evolving networking extensions and format structures, non-standard packet structure, or a mixture of such packets and standard packets, and provide packets arriving at other interface(s) 101 directly to the NIC 106 because more granular discrimination of these packets is deemed unnecessary.

In any event, the packet, and if the packet was parsed by the SDN_HDR packet parser 104(4), the information about the structure of the packet, and/or the information contained in the packet structure is provided to a SDN_HDR generator 104(4).

The SDN_HDR generator 104(4) examines at least one of the information provided by the network interface 102 and the SDN packet parser 104(2) in accordance with the rules, to determine, whether to build a tag, referred to herein as an SDN_HDR or not. Thus, considering the former example regarding rules for the SDN_HDR packet parser 104(4), the SDN_HDR generator 104(4) does not build the SDN_HDR for the non-parsed packets, and will build the SDN_HDR for the parsed packets. Considering the latter example, the SDN switch 104 may be programmed with rules instructing the SDN_HDR generator 104(4) to build the SDN_HDR for packets arriving at specified physical interface(s) 101, and provide packets arriving at other interface(s) 101 to the NIC 106.

If the determination is positive, the SDN_HDR generator 104(4) builds the SDN_HDR, and provides the SDN_HDR together with the packet to a NIC 106. The manner of providing the SDN_HDR may comprise pre-pending the SDN_HDR to the packet, appending the SDN_HDR at the end of the packet; out-of-band signaling, or any other manner of providing the SDN_HDR to the NIC 106. An exemplary SDN_HDR structure is disclosed in FIG. 2 and associated text infra.

If the determination is negative, the SDN switch 104 provides the packet to the NIC 106.

The NIC 106 comprises entities to support the RSS as well as utilize the information received in the SDN_HDR. A person of ordinary skill in the art will appreciate that the entities are depicted separately based on their function and not a physical arrangement. Additionally, different implementations may comprise different entities.

An SDN_HDR detection entity (106(0)) determines whether the SDN_HDR generator 104(4) provided only the packet or the SDN_HDR together with the packet, so that the packet may be correctly processed.

A network port lookup table 106(2) maps the network port number the packet was received on to the port's specific control information.

The network layer key parser 106(4) parses the packet according to rules for processing the OSI model layers L2, L3, and L4 headers and gathers information indicated by the rules.

Each layer in the OSI model may have plurality of formats. By means of an example, layer L2 formats may comprise Ethernet II frame, Novell raw IEEE 802.3 frame, IEEE 802.2 Logical Link Control (LLC) frame, IEEE 802.2 Subnetwork Access Protocol (SNAP) frame. The packet format lookup table 106(6) maps the packet format into a packet format specific control information, which may be used to further specify how to process the packet. Thus by means of an example, if a certain format of layer L2 is detected, the packet specific control information may specify that layer L4 is not be processed, e.g., because it is not desirable to process layer L4 information at the specific port. The packet format specific control information is combined with the port specific control information to produce an RSS key, which is provided to as an input to the RSS entity 106(8).

The RSS entity 106(8) processes the RSS key with hash function(s) according to a particular implementation of the RSS algorithm and generates an indirection index. The RSS to RQ lookup table 106(10) maps the indirection index to the one of the one or more RQ 106(12), to which the packet should be provided.

FIG. 2 depicts an exemplary structure of an SDN_HDR 200 in accordance with an aspect of this disclosure. To further clarify the relationship between certain elements of the conceptual structure of a system 100 for load balancing of a received traffic disclosed in greater details in FIG. 1 and associated text, references of structural elements of FIG. 1, are in parenthesis.

As disclosed supra, the SDN_HDR 200 is generated in accordance with the information about the structure of the packet, and/or the information contained in the packet structure as determined by the packet parser (104(2)) in accordance with the rules programmed into the SDN switch (104).

As depicted in FIG. 2, the SDN_HDR 200 comprises an optional reserved field 200(2) that is used in case that the structure of the SDN_HDR 200 needs to be byte aligned.

The SDN_ALG field 200(4) supports the options of processing the packet to obtain the one of the one or more RQ 106(12), to which the packet should be provided. By means of an example, a first value of the SDN_ALG field 200(4) instructs the NIC (106) to carry out an RSS, a second value of the SDN_ALG field 200(4) instructs the NIC (106) to directly map the packet to the RQ (106(12)) provided in the SDN_RQ field 200(6), thus bypassing all internal NIC entities to support the RSS; a third value of the SDN_ALG field 200(4) instructs the NIC (106) to use the SDN_RQ field 200(6) as a pointer into the packet format lookup table 106(6). A person skilled in the art will appreciate that other values of the SDN_ALG field 200(4) may define other processing options.

The SDN_RQ field 200(6) comprises the data to be used with some of the options of processing the packet as determined by the value of the SDN_ALG field 200(4).

SDN_FLOW field 200(8) comprises a value that is combined with the indirection index generated by the RSS entity 106(8). Such a combination may comprise e.g., Exclusive OR (XOR) logical function, AND logical function, OR logical function, or any other function known to a person skilled in the art.

Person of ordinary skills in the art will appreciate that the structure disclosed comprises a non-limiting example, meant to explain the concept. Consequently, other SDN_HDR structures may comprise other or additional fields defining or enabling additional processing modifications or extensions. Thus, by means of an example, an additional filed may provide ability to select a different hashing algorithm; to enable/disable extra lookup tables; to enable deeper non-standard packet structure parsing, and other modifications or extensions known to a person of ordinary skill in the art.

Figure 3A:
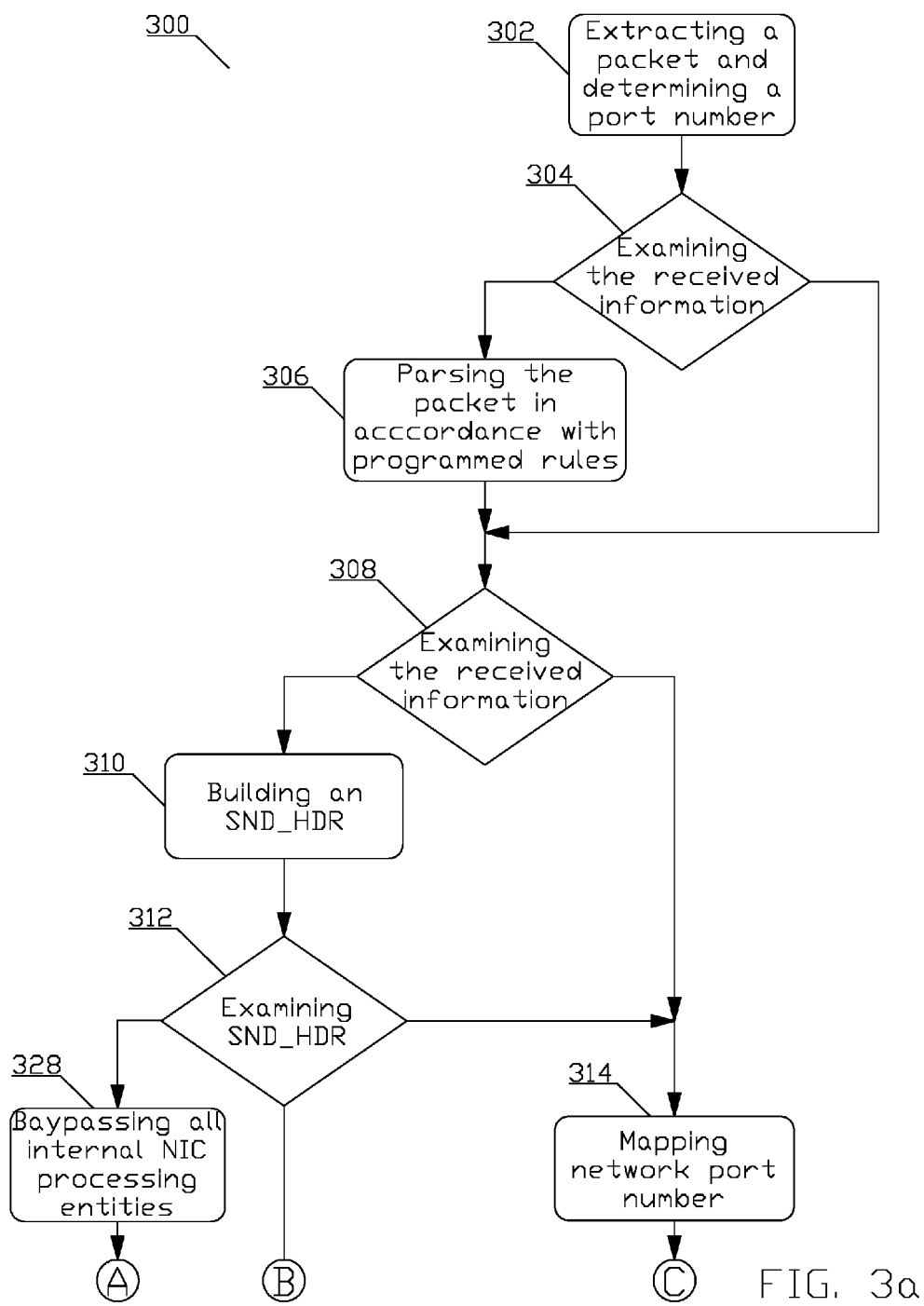
FIG. 3a depicts a first part of a flow chart of a process for load balancing of received traffic in accordance with an aspect of this disclosure.
Figure 3B:
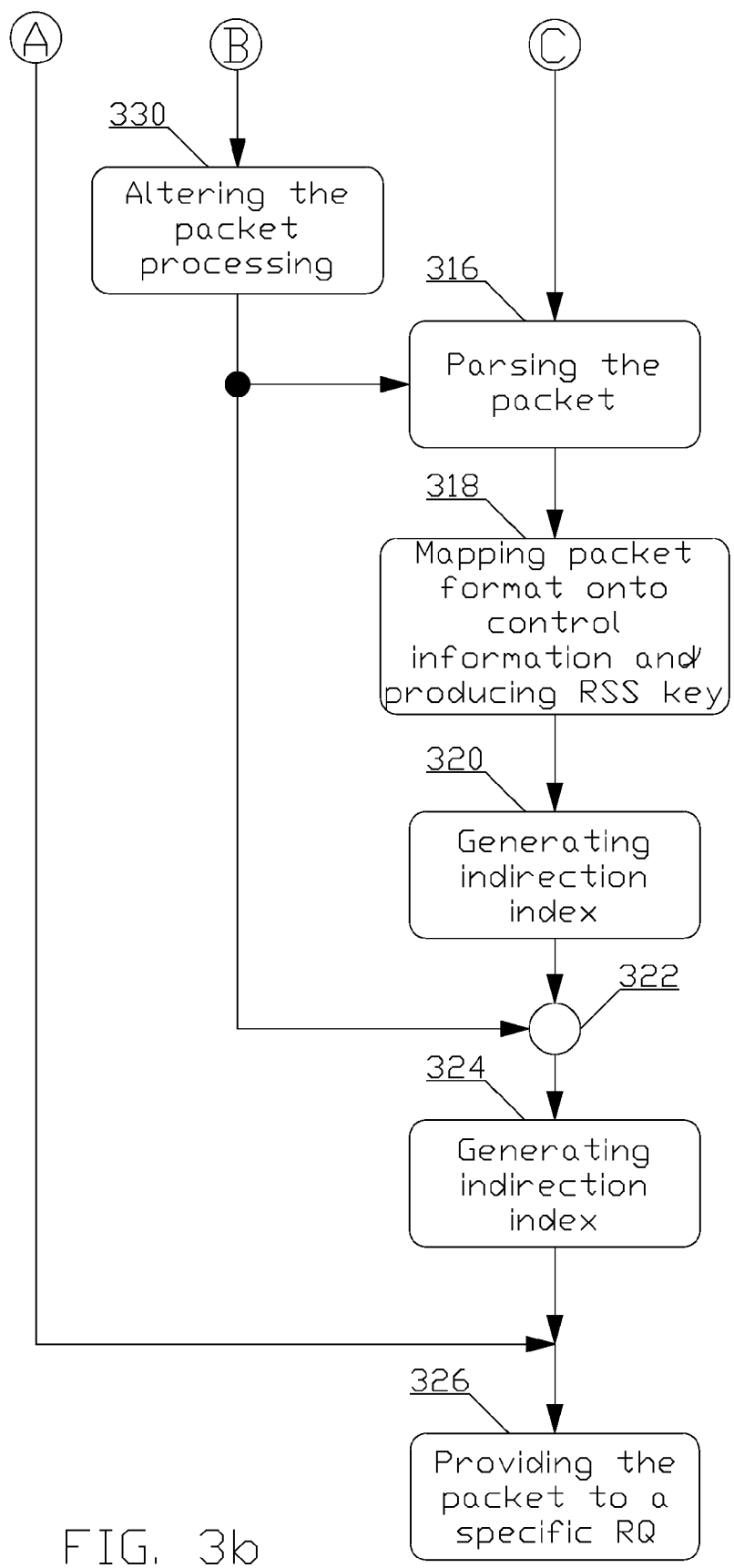
FIG. 3b depicts a second part of the flow chart of a process for load balancing of received traffic in accordance with an aspect of this disclosure.

FIG. 3 depicts a flow chart enabling the process 300 for load balancing of a received traffic. To further clarify the relationship between certain elements of the conceptual structure of a virtualization system 100 disclosed in greater details in FIG. 1 and associated text, with the flow chart of FIG. 3, references of structural elements of FIG. 1 are in parenthesis.

The process starts in block 302, where a sequence of packets transmitted over a transmission medium is provided via the physical port (101) to the network interface (102), which extracts the packet from the transmission medium and provides the packet together with the port number of the physical port 101 to the SDN switch (104). The process continues in block 304.

In block 304, the port number and the rules programmed into the SDN switch (104) are examined by the packet parser (104(2)) to determine, whether to parse the packet. If the determination is positive, the process continues in block 306; otherwise the information that the determination is negative is provided to the SDN_HDR generator (104(4)) and the process continues in block 308.

In block 306, the packet is parsed the packet parser (104(2)) in accordance with the rules programmed into the SDN switch (104). The information about the structure of the packet, and/or the information contained in the packet structure is provided to a SDN_HDR generator 104(4). The process continues in block 308.

In block 308, the received information is examined by the SDN_HDR generator (104(4)). When the information indicates that the packet was not parsed, the SDN_HDR generator (104(4)) does not have the information needed for building an SDN_HDR. Consequently, the SDN_HDR generator (104(4)) provides the packet to the NIC (106) and the process continues in block 314; otherwise the process continues in block 310.

In block 310, the SDN_HDR generator (104(4)) builds the SDN_HDR in accordance with the information about the structure of the packet, and/or the information contained in the packet structure. The SDN_HDR generator (104(4)) provides the packet together with the SDN_HDR to the NIC (106). The process continues in block 312.

In block 312, the information contained in the different fields of the SDN_HDR is extracted and examined by the SDN_HDR detection entity (106(0)). If the value of the SDN_ALG field instructs the NIC (106) to carry out standard RSS, the process continues in block 314, else if the value of the SDN_ALG field instructs the NIC (106) to directly map the packet to the specific RQ (106(12)) identified by the value in the SDN_RQ field 300(6), the process continues in block 328; otherwise the process continues in block 330. In block 314, the network port number the packet was received is mapped onto the port specific control information by the network port lookup table 106(2). The process continues in block 316.

In block 316, the packet is parsed according to rules for processing the OSI model layers L2, L3, and L4 headers information indicated by the rules is gathered by the network layer key parser 106(4). The process continues in block 318.

In block 318, the packet format is mapped into a packet format specific control information, which is combined with the port specific control information to produce an RSS key, by the packet format lookup table 106(6). The process continues in block 320.

In block 320, the RSS key is processed by a hash function(s) according to a particular implementation of the RSS algorithm 106(8) thus generating an indirection index. The indirection index passes though combining block 322 unaltered to the RSS to RQ lookup table (106(10)). The process continues in block 324.

In block 324 the indirection index is mapped by the RSS to RQ lookup table (106(10)) to the RQ 106(12), to which the packet should be provided. The process continues in block 326.

Since in block 312 it was determined that the value of SDN_ALG field instructs the NIC (106) to directly map the packet to the specific RQ (106(12)) identified by the value in the SDN_RQ field 300(6), in block 328, all internal NIC entities are bypassed and the process continues in block 326.

Since in block 312 it was determined that the value of the SDN_ALG field instructing the NIC (106) to use the SDN_RQ field (300(6)) as a pointer into the packet format lookup table 106(6), in block 330 the value use the SDN_RQ field (300(6)) is provided to block 316, to augment or overwrite the port specific control information. In addition, the value of the SDN_FLOW field (300(8)) is combined with the indirection index generated by the RSS entity (106(8)) in combiner 322, and the combined value is provided to the RSS to RQ lookup table (106(10)). The process continues in block 324.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein. By means of an example, the flow chart enabling the process for load balancing of a received traffic discloses an aspect disclosed supra, wherein the SDN_HDR packet parser 104(4) parses only packets arriving at specified physical interface(s) 101, and provides packets arriving at other interface(s) 101 directly to the NIC 106, thus implicitly deciding for which packets an SDN_HDR will be build. A person of ordinary skill in the art will be able to modify the teaching for the aspect disclosed supra, wherein the SDN_HDR packet parser 104(4) parses all packets and the SDN switch 104 will be programmed with rules instructing the SDN_HDR generator 104(4) to build the SDN_HDR for packets arriving at specified physical interface(s) 101.

All structural and functional equivalents to the various illustrative logical blocks, modules, circuits, and algorithm blocks described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm blocks may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "block for."

What is claimed is:

1. A method for load balancing of a received packet based network traffic, comprising:
   receiving a packet at a network interface;
   determining a physical port identifier in accordance with a physical port receiving the packet;
   providing the packet and the determined physical port identifier to a software defined network switch;
   determining information pertaining to uniqueness of a packet flow for the received packet by parsing at least one layer of the packet in accordance with rules of the software defined network switch and determining a tag from the at least one parsed layer in accordance with the rules;
   determining that the received packet comprises a non-standard packet structure upon the physical port identifier identifying one of a first set of physical ports;
   providing the tag together with the received packet to a network interface controller when the received packet comprises the non-standard packet structure;
   providing at least the received packet to the network interface controller when the received packet comprises a standard packet structure upon the physical port identifier identifying one of a second set of physical ports; and
   processing the received packet at the network interface controller in accordance with at least one of the provided tag and the packet structure; wherein the received packet comprising the standard packet structure is processed in accordance with a receive side scaling.

2. The method as claimed in claim 1, wherein the processing the received packet at the network interface controller in accordance with at least one of the provided tag and the packet structure comprises:
   determining a value of a first field in the tag; and
   processing the received packet in accordance with the determined value.

3. The method as claimed in claim 2, wherein the processing the received packet in accordance with the determined value comprises:
   processing the received packet in accordance with a receive side scaling as indicated by the first field's determined value comprising a first value.

4. The method as claimed in claim 2, wherein the processing the received packet in accordance with the determined value comprises:
   modifying a receive side scaling as indicated by the first field comprising other than a first value.

5. The method as claimed in claim 4, wherein the modifying a receive side scaling as indicated by the first field comprising other than a first value comprises:
   determining a value of a second field in the tag as indicated by the first field comprising a second value; and
   mapping the packet to a received queue indicated by the determined value of the second field.

6. The method as claimed in claim 4, wherein the modifying a receive side scaling as indicated by the first field comprising other than a first value comprises:
   determining a value of a second field in the provided tag as indicated by the first field comprising a third value; and
   using the determined value of the second field of the tag as a pointer into a packet format lookup table of the receive side scaling.

7. The method as claimed in claim 6, further comprising:
   determining a value of a third field in the tag as indicated by the first field comprising the third value; and
   combining an indirection index generated by the receive side scaling with the determined value of the third field.

8. An apparatus for load balancing of a received packet based network traffic, comprising:
   a network interface configured to:
      receive a packet;
      determine a physical port identifier in accordance with a physical port receiving the packet; and
      provide the packet and the determined physical port identifier to a software defined network switch communicatively coupled to the network interface; and
   a network interface controller communicatively coupled to the software defined network switch; wherein the software defined network switch is configured to:
      receive the packet and the determined physical port identifier;
      determine information pertaining to uniqueness of a packet flow for the received packet by parsing at least one layer of the packet in accordance with rules of the software defined network switch and determining a tag from the at least one parsed layer in accordance with the rules;
      determine that the received packet comprises a non-standard packet structure upon the physical port identifier identifying one of a first set of physical ports;
      provide the tag together with the received packet to the network interface controller when the received packet comprises the non-standard packet structure; and
      provide at least the received packet to the network interface controller when the received packet comprises a standard packet structure upon the physical port identifier identifying one of a second set of physical ports; and
   the network interface controller is configured to process the received packet in accordance with at least one of the provided tag and the packet structure; wherein the received packet comprising the standard packet structure is processed in accordance with a receive side scaling.

9. The apparatus as claimed in claim 8, wherein the network interface controller processes the received packet in accordance with at least one of the provided tag and the packet structure by being configured to:
   determine a value of a first field in the provided tag; and
   process the received packet in accordance with the determined value.

10. The apparatus as claimed in claim 9, wherein the network interface controller processes the received packet in accordance with the determined value by being configured to:

process the received packet in accordance with a receive side scaling as indicated by the first field's determined value comprising a first value.

11. The apparatus as claimed in claim 9, wherein the network interface controller processes the received packet in accordance with the determined value by being configured to:
modify the receive side scaling as indicated by the first field comprising other than the first value.

12. The apparatus as claimed in claim 11, wherein the network interface controller modifies the receive side scaling as indicated by the first field comprising other than the first value by being configured to:
determine a value of a second field in the tag as indicated by the first field comprising a second value; and
map the packet to a received queue indicated by the determined value of the second field.

13. The apparatus as claimed in claim 11, wherein the network interface controller modifies the receive side scaling as indicated by the first field comprising other than the first value by being configured to:
determine a value of a second field in the provided tag as indicated by the first field comprising a third value; and
use the determined value of the second field of the tag as a pointer into a packet format lookup table of the receive side scaling.

14. The apparatus as claimed in claim 13, wherein the network interface controller is further configured to:
determine a value of a third field in the tag as indicated by the first field comprising the third value; and
combine an indirection index generated by the receive side scaling with the determined value of the third field.

* * * * *